US008721251B1

(12) United States Patent  
Razumov

(10) Patent No.: US 8,721,251 B1  
(45) Date of Patent: May 13, 2014

(54) SELF-LIFTING ROBOTIC DEVICE WITH MOVABLE CARRIAGES

(71) Applicant: Sergey N. Razumov, Moscow (RU)

(72) Inventor: Sergey N. Razumov, Moscow (RU)

( * ) Notice: Subject to any disclaimer, the term of this patent is extended or adjusted under 35 U.S.C. 154(b) by 0 days.

(21) Appl. No.: 13/854,657

(22) Filed: Apr. 1, 2013

(51) Int. Cl.  
*B65G 1/00* (2006.01)  
*B65G 65/00* (2006.01)

(52) U.S. Cl.  
USPC ........ 414/281; 414/279; 414/471; 198/468.6; 108/144.11; 901/7

(58) Field of Classification Search  
USPC ......... 198/347.4, 463.3, 468.6; 414/279, 281, 414/282, 283, 284, 331.14, 331.17, 471; 108/144.11, 147.11; 700/214, 230; 701/19; 901/7  
See application file for complete search history.

(56) References Cited

U.S. PATENT DOCUMENTS

| | | | | |
|---|---|---|---|---|
| 3,373,844 A * | 3/1968 | Schafer | 182/141 |
| 4,273,494 A * | 6/1981 | Swain et al. | 414/266 |
| 4,372,219 A * | 2/1983 | Gibbs | 104/165 |
| 4,395,181 A * | 7/1983 | Loomer | 414/284 |
| 4,657,463 A * | 4/1987 | Pipes | 414/495 |
| 4,690,601 A * | 9/1987 | Delius et al. | 414/795.3 |
| 4,856,956 A * | 8/1989 | Zur | 414/280 |
| 5,139,384 A * | 8/1992 | Tuttobene | 414/281 |
| 5,213,463 A * | 5/1993 | Rothlisberger et al. | 414/280 |
| 5,433,293 A * | 7/1995 | Sager | 187/249 |
| 5,501,295 A * | 3/1996 | Muller et al. | 187/406 |
| 5,564,880 A * | 10/1996 | Lederer | 414/280 |
| 5,609,220 A * | 3/1997 | Moriya et al. | 180/253 |
| 5,658,120 A * | 8/1997 | Watanabe | 414/495 |
| 5,829,948 A * | 11/1998 | Becklund | 414/607 |
| 5,839,872 A * | 11/1998 | Goto et al. | 414/280 |
| 5,839,876 A * | 11/1998 | McCarthy et al. | 414/590 |
| 5,952,796 A * | 9/1999 | Colgate et al. | 318/1 |
| 5,967,728 A * | 10/1999 | Gales et al. | 414/284 |
| 6,112,858 A * | 9/2000 | Arnst | 187/269 |
| 6,149,366 A * | 11/2000 | Deandrea | 414/279 |
| 6,602,039 B1* | 8/2003 | Dimitri et al. | 414/281 |
| 6,889,813 B1* | 5/2005 | Trammell et al. | 198/346.3 |
| 6,929,440 B1* | 8/2005 | Grond | 414/284 |
| 7,128,521 B2* | 10/2006 | Hansl | 414/807 |
| 7,381,022 B1* | 6/2008 | King | 414/267 |
| 7,559,738 B2* | 7/2009 | Salm et al. | 414/799 |
| 7,591,630 B2* | 9/2009 | Lert, Jr. | 414/807 |
| 7,753,637 B2* | 7/2010 | Benedict et al. | 414/140.3 |
| 7,784,407 B2* | 8/2010 | Di Rosa et al. | 104/48 |
| 7,787,985 B2* | 8/2010 | Tsujimoto et al. | 700/214 |
| 7,837,424 B2* | 11/2010 | Solomon | 414/331.04 |
| 7,871,232 B2* | 1/2011 | Lutz | 414/279 |
| 7,959,396 B2* | 6/2011 | Izumi | 414/279 |
| 8,105,005 B2* | 1/2012 | Yoshida et al. | 414/282 |
| 8,403,614 B2* | 3/2013 | Bastian et al. | 414/282 |
| 8,527,153 B2* | 9/2013 | Doan | 701/49 |
| 2007/0071585 A1* | 3/2007 | Henkel | |

* cited by examiner

*Primary Examiner* — Douglas Hess  
(74) *Attorney, Agent, or Firm* — McDermott Will & Emery LLP

(57) ABSTRACT

A robotic device for carrying loads is movable in a vertical direction between rails arranged in multiple rows at various levels with respect to ground. The robotic device has a frame, wheels coupled to the frame for moving the frame along the rails, and a platform provided on the frame to carry a first load when the frame is moved in a vertical direction between first rails and second rails arranged above the first rails. Movable carriages are configured for being moved in the vertical direction at distance greater than a distance between the first rails and the second rails. A lifting mechanism moves the carriages in the vertical direction with respect to the frame. Support handles are arranged on the movable carriages and configured for providing engagement with the first or second rails to raise the frame above the respective rails to a level sufficient to disengage the wheels from the respective rails.

8 Claims, 9 Drawing Sheets

SELF-LIFTING ROBOTIC DEVICE WITH MOVABLE CARRIAGES

TECHNICAL FIELD

This disclosure relates to robotics, and more particularly, to a self-lifting robotic device having movable carriages for handling loads while moving in a vertical direction without assistance of external lifts.

BACKGROUND ART

Storage or warehouse systems may include multi-level storage racks for storing loads, such as boxes, containers or pallets, at each of the multiple levels. Access to the stored loads may be provided by a shuttle system including multiple remotely controlled robotic devices or shuttles arranged on each level. The shuttles move back and forth in a single horizontal direction within one storage level to access stored goods arranged on the corresponding level and carry them.

A lifting mechanism, such as a forklift, is provided to move loads in a vertical direction from the ground to the respective level of the storage rack or from the respective level to the ground. The forklift lifts newly arriving goods to the respective level and loads them to the shuttles that deliver the goods to required storage cells at that level. Similarly, shuttles retrieve goods from the storage cells and deliver them to the forklift raised to the respective level. The forklift unloads the goods from the shuttles and moves them in a vertical direction down to the ground.

However, the number of lifts in any efficient storage system employing multiple shuttles is substantially less than the number of shuttles. Therefore, "bottlenecks" are created near the lifts, reducing the throughput of the storage system.

Therefore, there is a need for a new "self-lifting" technique that would enable a robotic device, such as a shuttle, to move in a vertical direction without assistance of an external lift.

My copending U.S. patent application Ser. No. 13/675,433 filed on Nov. 13, 2012, entitled SELF-LIFTING ROBOTIC DEVICE WITH LOAD HANDLING MECHANISM and incorporated herewith by reference, discloses a robotic device that carries multiple boxes held in multiple rows. However, this robotic device is not able to move in a vertical direction when it carries the maximum number of boxes that can be loaded onto the robotic device.

Hence, there is a need for a robotic device capable of moving in a vertical direction while carrying the maximum possible load.

SUMMARY OF THE DISCLOSURE

In accordance with one aspect, the disclosure offers a robotic device for carrying loads and movable in a vertical direction between rails arranged in multiple rows at various levels with respect to ground. The robotic device has a frame, wheels coupled to the frame for moving the frame along the rails, and a platform provided on the frame to carry a first load when the frame is moved in a vertical direction between first rails and second rails arranged above the first rails. Movable carriages are configured for being moved in the vertical direction at distance greater than a distance between the first rails and the second rails. A lifting mechanism moves the carriages in the vertical direction with respect to the frame. Support handles are arranged on the movable carriages and configured for providing engagement with the first or second rails to raise the frame above the respective rails to a level sufficient to disengage the wheels from the respective rails.

The supporting handles may be further configured for raising the frame with respect to the first or second rails when the support handles push against the second rails.

A wheels turning mechanism may turn the wheels with respect to a direction of the first or second rails when the frame is raised with respect to the first or second rails.

The platform may be further configured for carrying a grasping element movable by the platform in a horizontal direction with respect to the frame to take a load and place the load onto the platform.

The movable carriages may be fixed to the platform when the grasping element takes the load.

The robotic device may further have side walls attached to the frame, and holding elements provided on the side walls for holding the load.

In accordance with the method of the present disclosure the following steps may be carried out for operating a robotic device movable in a vertical direction from first rails to second rails arranged at a different vertical level than the first rails, and having a frame, wheels coupled to the frame for moving the frame along the first and second rails, a platform for carrying a first load, holding elements for holding a second load above the first load, and a movable carriages having support handles:

engaging the support handles with the second rails to move the frame in a vertical direction, and loading the first or second load when the movable carriage is fixed to the platform.

The first and second loads may be moved in the vertical direction together with the frame when the movable carriage is not fixed to the platform.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using exemplary embodiments described in the present disclosure. It will become apparent, however, that the concept of the disclosure is applicable to any robotic device movable in a vertical direction without an external lifting device.

Figure 1:
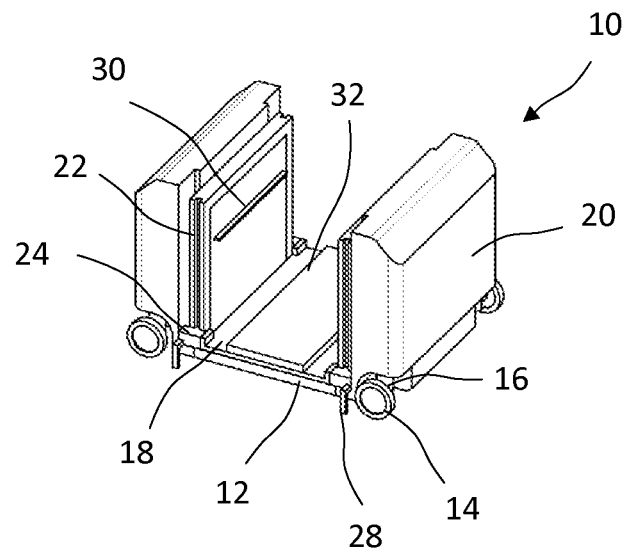
FIG. 1 shows an exemplary embodiment of a robotic device of the present disclosure.

FIG. 1 shows an exemplary embodiment of a robotic device 10 of the present disclosure. The robotic device 10 may operate in a storage system arranged in a warehouse or retail facility. The storage system may have rails arranged in multiple rows corresponding to multiple levels of the storage system. Each row may include horizontal rails enabling the robotic device to move in horizontal directions. For example, the robotic device 10 may be configured for moving along a pair of horizontal rails. Also, as discussed below, the robotic device 10 has a self-lifting mechanism enabling the robotic device 10 to move between rails in a vertical direction.

In accordance with an exemplary embodiment, the robotic device 10 have a frame 12 with four wheels 14 attached to the frame 12. The frame 12 may be formed as a braced structure for supporting elements required to operate the robotic device 10. Each wheel 14 may be attached to the frame 12 so as to rotate in a vertical plane about an axis extending from the center of the wheel 14 in order to move the robotic device 10 along the rails.

Four turning elements 16, such as vertical pivots, may be used for attaching the respective wheels 14 to the frame so as to turn each wheel 14 at a required angle. In particular, the wheel 14 may be turned in a horizontal plane about the vertical axis of the respective turning element 16. For example, each wheel 14 may be turned in a horizontal plane about 90 degrees with respect to the direction of a rail. Also, the turning elements 16 may be configured for turning the wheels 14 in a plane different from the horizontal plane. Each turning element 16 is arranged with respect to the frame 12 so as to make the width of the robotic device 10 with the wheels 14, smaller than a distance between adjacent rails in a direction perpendicular to the direction of the rails, when the wheels 14 are turned into the direction perpendicular to the direction of the rails.

As discussed below, the wheels 14 may be turned in a horizontal plane to support moving the robotic device 10 in the vertical direction, and to support turning the robotic device 10 to a horizontal direction perpendicular to a current horizontal direction of the robotic device 10. Although in an exemplary embodiment, the robotic device 10 has four wheels 14, one skilled in the art would realize that the present concept is applicable to any number of wheels that can be provided to support movement of the robotic device 10.

The frame 12 may hold a platform 18 that can be used for carrying loads, such as boxes, pallets and containers, delivered by the robotic device 10 in a storage system in a warehouse or retail environment. For example, the platform 18 may be a rectangular metal plate configured to accommodate boxes, pallets and containers with goods. Side walls 20 may be provided on the frame 16 to support loading and carrying goods.

Each lifting mechanism 22 supports a pair of movable carriages 24. As discussed below, movable carriages 24 may be moved in a vertical direction to support vertical movements of the robotic device 10. Lifting mechanisms 22 may be arranged on the respective side walls 20 for moving movable carriages 24 up or down in a vertical direction. For example, each lifting mechanism 22 may be implemented using a belt drive.

Figure 2:
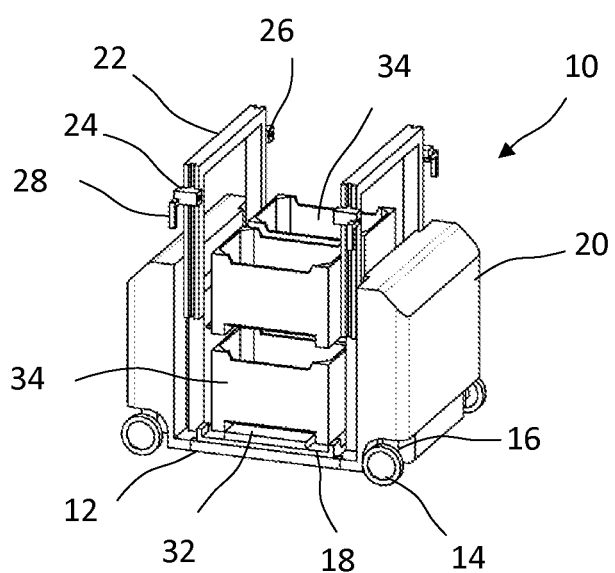
FIG. 2 shows an example of a fully loaded robotic device carrying loads arranged in multiple rows.

Each lifting mechanism 22 may be configured as a rectangular frame 22 movable in a vertical direction as shown in FIG. 2. The movable carriages 24 are configured for moving in a vertical direction with respect to the rectangular frames 22 along guides formed on the vertical elements of the rectangular frames 22.

Although an exemplary embodiment in FIGS. 1 and 2 present the robotic device 10 having a pair of lifting mechanisms 22 and two pairs of movable carriages 24, one skilled in the art would realize that the concept of the present disclosure is applicable to any number of the lifting mechanisms 22 and carriages 24.

As shown in FIG. 2, a fixing element 26 is arranged on each carriage 24 for fixing the platform 18 to the carriage 24. The fixing element 26 may be implemented by any locking mechanism, such as a mechanical or electrical latch, a locking bolt, an electromagnetic lock, etc. FIG. 2 shown an example in which the carriages 24 are not attached to the platform 18 and are raised with respect to the frame 12. A controlled part of the fixing element 26 may be arranged on the carriage 24 or on the platform 18.

Deployable support handles 28 may be arranged on the carriages 24. The support handles may be L-shaped pins extendable from the carriages 24, as shown in FIG. 2. In a deployed state, the support handles 28 may be held in slots formed in the carriages 24.

Each side wall 20 supports a holding element 30 provided for holding additional loads when the robotic device 10 moves. The holding element 30 may be implemented as flat shelves or pins extendable in a horizontal direction from the side wall 20. FIG. 1 shows a flat shelf 30 arranged in a non-deployed state in a slot formed in the side wall 20. As shown below, the flat shelves 30 are extended from the side walls 20 during loading operations.

The platform 18 supports a grasping element 32 configured for handling loads, for example, for taking loads from a storage rack and placing them onto the robotic device 10. The grasping element 32 may be extended in a horizontal direction from any side of the robotic device 10 so as to take a load arranged at the respective side and place it onto the robotic device 10, or to unload goods from the robotic device 10 to a storage rack arranged at the respective side. For example, the grasping element 32 may be implemented as a metal plate, spade or fork. FIG. 2 illustrates an example in which boxes 34 are arranged in two rows. The lower row of the boxes 34 is carried by the grasping element 32, and the upper row is held by the holding elements 30.

Figure 3:
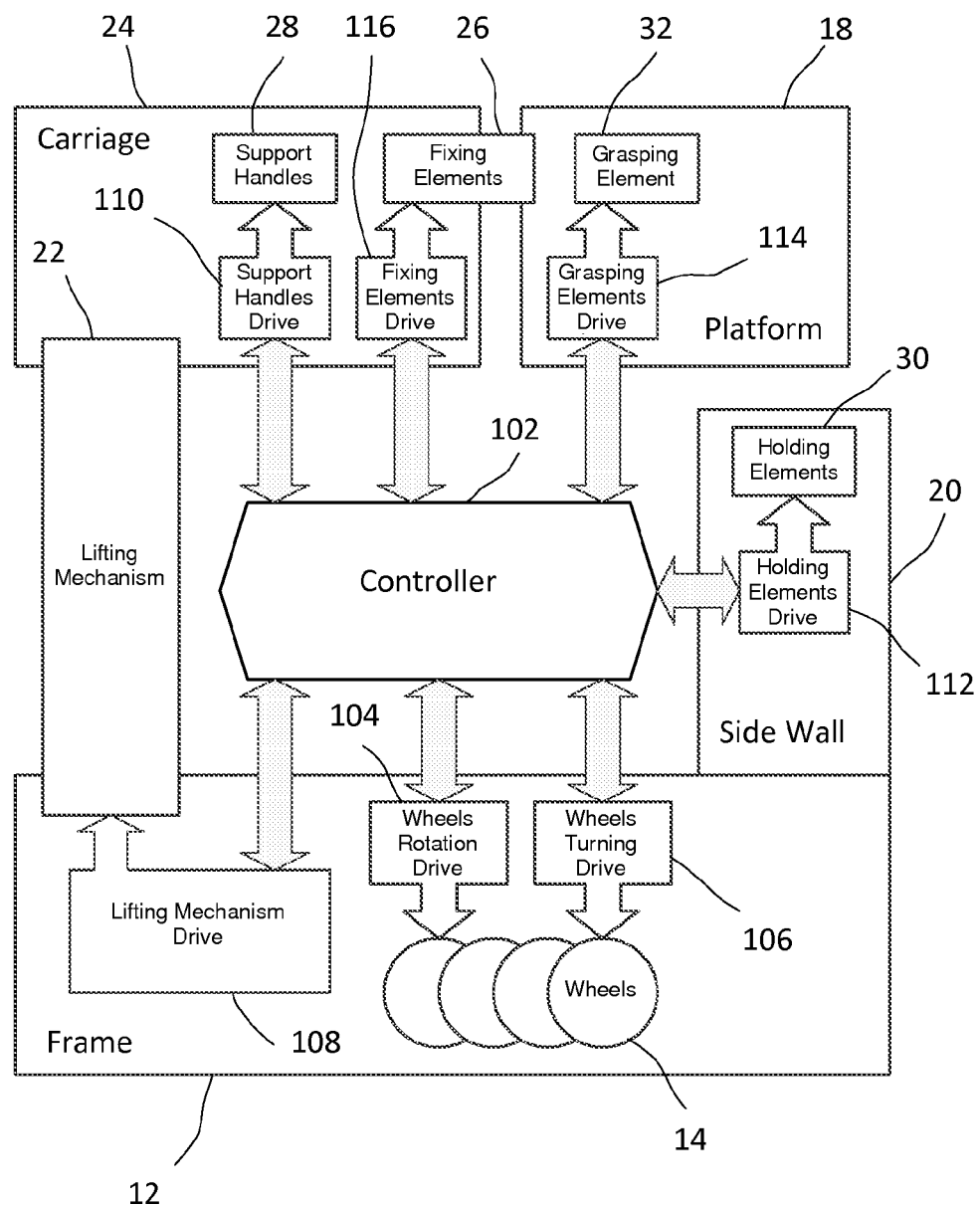
FIG. 3 is a simplified exemplary diagram showing elements for providing operation of the robotic device.

FIG. 3 is a simplified diagram that illustrates elements for supporting various operations performed by the robotic device 10. The operations of the robotic device 10 are controlled by a controller 102 that may include a data processor responsive to external commands for processing the commands and producing various control signals. The controller may have a radio transceiver for providing bidirectional data communications with external objects via a radio network, such as a WiFi network. A controller area network (CAN) bus may connect the controller 102 with various elements of the robotic device 10 to supply control signals to the elements of the robotic device 10 and receive responses.

In particular, the controller 102 may control a wheels rotation drive 104, a wheels turning drive 106, a lifting mechanisms drive 108, support handles drives 110, holding elements drives 112, a grasping element drive 114 and fixing elements drives 116. The wheels rotation drive 104, wheels turning drive 106 and platform lifting mechanisms drive 108 may be arranged on the frame 12, whereas the support handles drives 110 and the fixing elements drives 116 may be arranged on the respective movable carriages 24. The grasping element drive 114 may be provided on the platform 18. The holding elements drives 112 may be provided on the respective side walls 20.

The wheels rotation drive 104 is provided for driving the wheels 14 so as to rotate them in a vertical plane in order to move the robotic device 10 along the rails in a horizontal direction. The wheels turning drive 106 drives the turning elements 16, such as pivots, so as to turn the respective wheels 14 in a horizontal plane. The wheels 14 may be turned 90 degrees about the vertical axes of the pivots 16. As one skilled in the art would realize, the wheels drives 104 and 106 may be implemented using any of well known mechanisms for rotating and turning wheels.

The lifting mechanisms drive 108 is provided for driving the lifting mechanisms 22 that move the carriages 24 up and down in a vertical direction. As one skilled in the art would realize, the lifting mechanisms 22 and drive 108 may be implemented using any well known mechanisms for moving a plate up and down. For example, telescopic mechanisms can be utilized.

The support handles drive 110 is used for extending the support handles 28 from the slots on the carriages 24 when the support handles 28 are required to support movements of the robotic device 10, and for hiding the support handles 24 back into the slots on the carriages 24 when the support handles 28 are no longer required. The drive 110 may be implemented using any well known mechanism for extending a pin.

The holding elements drive 112 is provided for extending the holding elements 30, such as shelves, from the respective side wall 20 when the holding elements are required for holding loads. The holding elements drive 112 hides the holding elements 30 into the side wall 20 when they are not required. The holding elements drive 112 that causes the holding elements 30 to perform a linear motion while extending from the sidewall 20, may be implemented using well known linear motion mechanisms such as a ball screw transmission mechanism, belt or chain drives. Alternatively, the holding elements 30 may be turned with respect to the sidewall 20. In this case, turning mechanisms, such as reduction gear or link mechanism, may be used as the holding elements drive 112.

The grasping element drive 114 is provided for extending the grasping element 32 from a desired side of the robotic device 10 so as to enable the grasping element 32 to operate with a load. For example, the grasping element drive 114 may be implemented using a telescopic linear actuator. The fixing elements drive 116 is responsible for controlling the fixing elements 26 so as to fix the platform 18 to the carriages 24.

Figure 4:
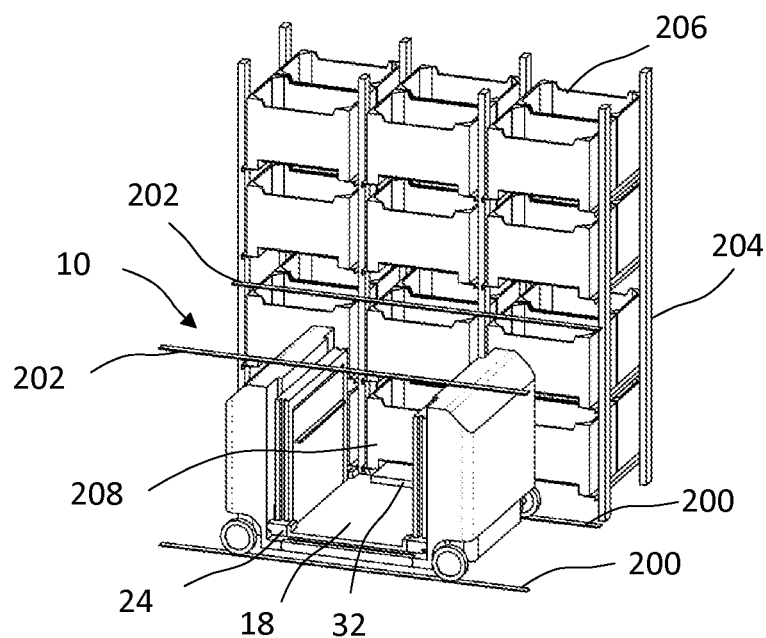
FIGS. 4-12 illustrate exemplary loading operations performed to load the robotic device with loads arranged in two rows.
Figure 5:
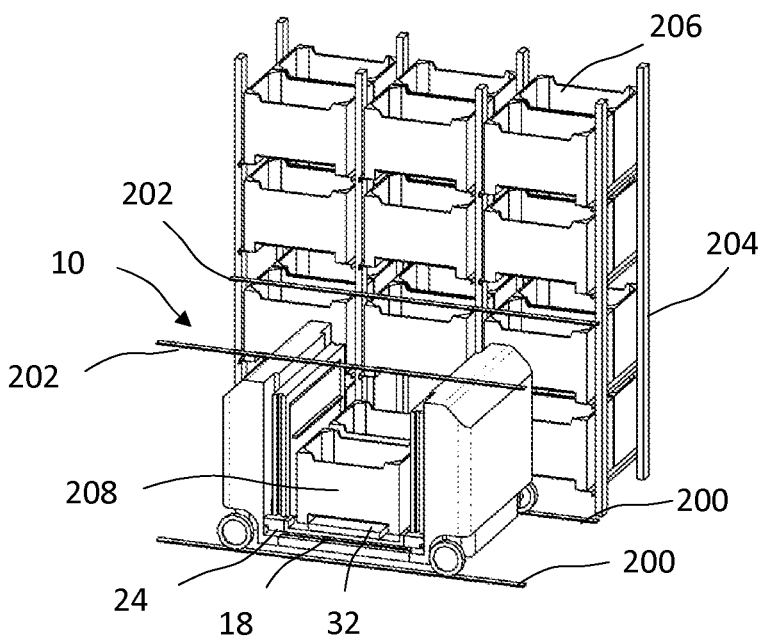

FIGS. 4 and 5 illustrate exemplary loading operations performed by the robotic device 10 in a storage facility. In particular, FIG. 4 shows the robotic device 10 standing on a pair of rails 200 extending in a horizontal direction. Also, FIG. 3 shows a pair of horizontal rails 202 arranged in a storage facility above the rails 200.

In an exemplary embodiment of the present disclosure, the storage facility may have multiple storage racks 204 for storing boxes 206 arranged in multiple horizontal rows and multiple vertical columns. Pairs of horizontal rails 200 and 202 may be provided at different vertical levels of the storage facility so as to provide the robotic device 10 with access to boxes 206 arranged at the corresponding levels of the storage facility from both sides of the pairs of rails 200 and 202. For example, FIG. 4 shows two boxes 206 arranged in each vertical column between the rails 200 and 202.

Also, FIG. 4 shows a box 208 representing one of the boxes being loaded by the robotic device 10. In particular, in order to load the box 208, the controller 102 controls the wheels rotation drive 104 to rotate the wheels 14 along the rails 200 so as to position the robotic device 10 with respect to the box 208. When the box 208 is being loaded, the platform 18 should be fixed to the carriages 24. The controller 102 controls the fixing elements drive 116 at each carriage 24 so as to fix the platform 18 to the carriages 24.

Then, as shown in FIG. 5, the controller 102 controls the platform lifting mechanism drive 108 to cause the lifting mechanism 22 to move the carriages 24 with the platform 18 in a vertical direction so as to lift them with respect to the frame 12 at a level required to grasp the box 208. Thereafter, the controller 102 controls the grasping element drive 114 to extend the grasping element 28 from the platform 18 in a horizontal direction so as to position the grasping element 28 under the box 208. For example, as shown in FIG. 4, the box 208 may have a recess at the bottom provided to enable the grasping element 28 to penetrate under the box 208.

The platform 18 is lifted again to allow the grasping element 28 to take one or more boxes 208. For example, FIG. 5 shows a pair of boxes taken by the grasping element 28. Thereafter, the grasping element 32 is controlled to return into its original non-extended position. As a result, the grasping element 32 moves the boxes 208 and places them on the platform 18.

Figure 6:
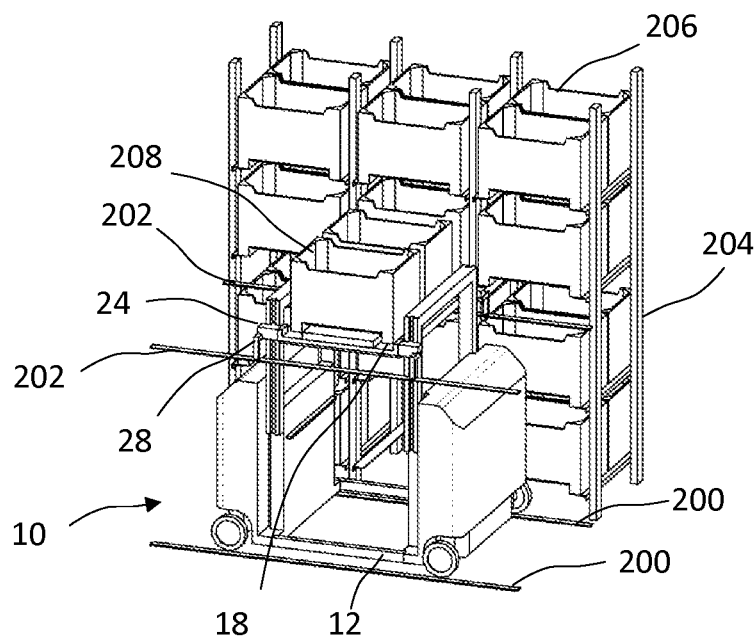

FIGS. 6-9 illustrate exemplary operations performed by the robotic device 10 when it carries the boxes 208 and moves in a vertical direction from the rails 200 to the rails 202. In particular, as shown in FIG. 6, to enable the robotic device 10 to move in a vertical direction, the controller 102 controls the lifting mechanisms drive 108 to cause the lifting mechanisms 22 on both side walls 20 to raise the carriages 24 with the platform 18 with respect to the frame 12 in a vertical direction above the level of the rails 202.

After the carriages 24 with the platform 18 is raised above the level of the rails 202, or simultaneously with raising the carriages 24, the support handles drive 110 is controlled to deploy the support handles 28. The deployment of the support handles 28 may be provided by extending each of them from the respective slot on the carriage 24 to a position directly above the respective rail 202.

For example, each support handle 28 may be implemented as an L-shaped support pin 28 shown in FIGS. 6-9. During the deployment, the support pin 28 may be extended and placed directly above the respective rail 202. Thereafter, the carriages 24 with the platform 18 is lowered to a lower position so as to engage each support pin 28 with the respective rail 202 and raise the frame 12 with respect to the rails 200 by pushing the support pins 28 against the rails 202. The frame 12 is raised to a level sufficient to disengage the wheels 14 from the rails 200.

Figure 7:
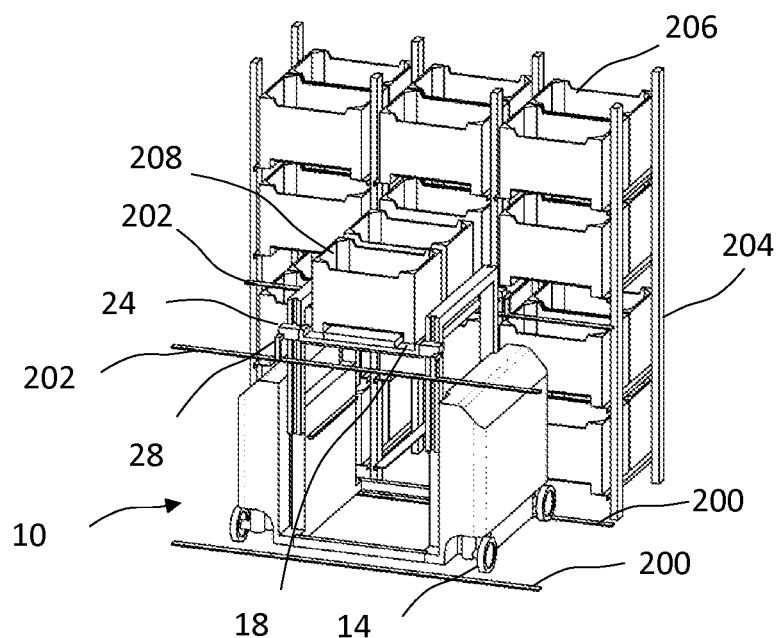

As shown in FIG. 7, when the wheels 14 become disengaged from the rails 200, the wheels turning drive 106 is controlled so as to turn each of the wheels 14 in a horizontal plane using the respective turning elements 16. For example, each wheel 14 may be turned about the vertical axis of the turning element 16 by an angle equal to approximately 90 degrees. The position of the turning element 16 with respect to the frame 12 is selected so as to provide the maximum distance between the edges of the turned wheels 14 in a direction perpendicular to the direction of the rails 200, smaller than the distance between the rails in the horizontal direction.

Figure 8:
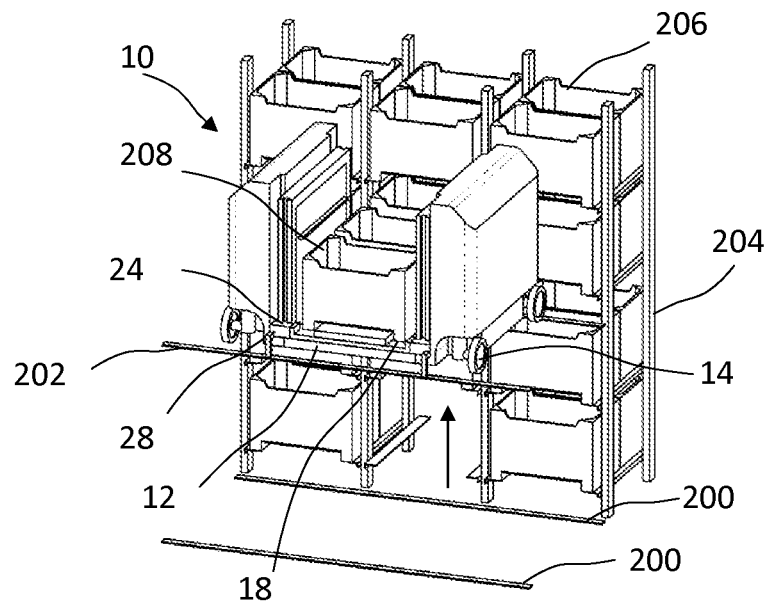

As shown in FIG. 8, the support handles 28 fix the carriages 24 with the platform 18 on the rail 202 so as to enable the lifting mechanisms 22 to lift the frame 12 so as to reduce the distance between the platform 18 and the frame 12 in a vertical direction. The frame 12 may be lifted to a level above the rails 202 so as to place the platform 18 carrying the boxes on the frame 12. As the distance between the edges of the turned wheels 14 is less than the distance between the rails 202 in a direction perpendicular to the direction of the rails 202, the frame 12 with the wheels 14 can be transferred in the space between a pair of the horizontal rails 202.

Figure 9:
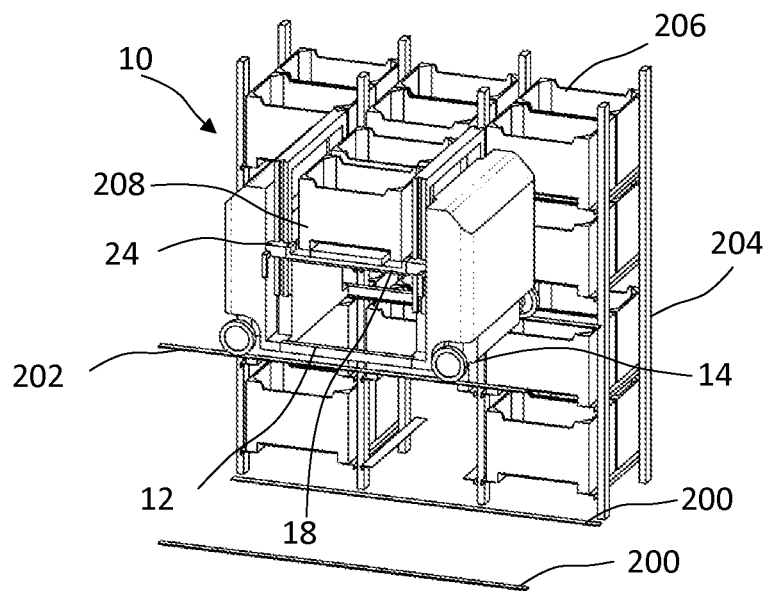

As shown in FIG. 9, when the frame 12 is raised to a desired position above the rails 202, the wheel turning drive 106 is controlled to turn the wheels 14 using the respective turning elements 16 so as to return each wheel 14 to an initial position along the rails. Thereafter, the frame 12 is lowered so as to place the wheels 14 on the rails 202, and the support handles 28 may be removed from the rails 202 and placed into the respective slots on the carriages 24.

Hence, the robotic device 10 standing on lower rails 200 and holding the loads can lift itself in a vertical direction to a level of higher rails 202 in the next row of rails so as to continue movement along the rails 202. As one skilled in the art would realize, a similar technique can be used to move the robotic device 10 with the load down in a vertical direction from higher rails 202 to lower rails 200 in the next row of the rails. No external lifting device is required for moving the robotic device up or down in a vertical direction.

Further, as shown in FIG. 9, the carriages 24 with the platform 18 are lifted by the lifting mechanism 108 in a vertical direction. When the platform 18 is being lifted, the fixing elements 26 provides secure attachment of the carriages 24 to the platform 28. The platform 18 is raised until the bottom edge of the boxes 208 is positioned above the holding elements 30.

Figure 10:
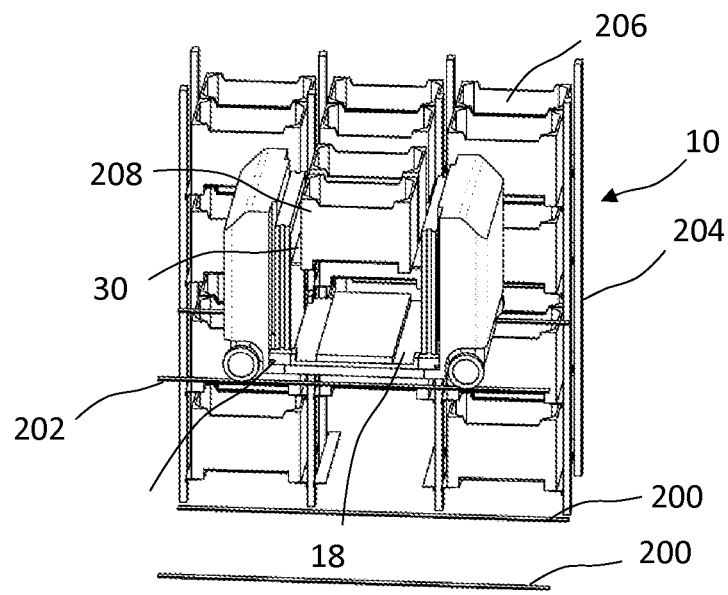

Thereafter, as shown in FIG. 10, the holding elements 30 are extended from the side walls 20 by the holding element drive 112. The size of the holding elements 26 is selected so as to keep the boxes 208 positioned on the holding elements 30 when the platform 18 moves down.

Then, the platform 18 may be moved down to the level of the frame 12. When the platform 18 moves below the holding elements 30, the boxes 208 are kept by the holding elements 30. When the boxes 208 are removed from the platform 18, the grasping element 32 is released and can be used for loading additional boxes.

Figure 11:
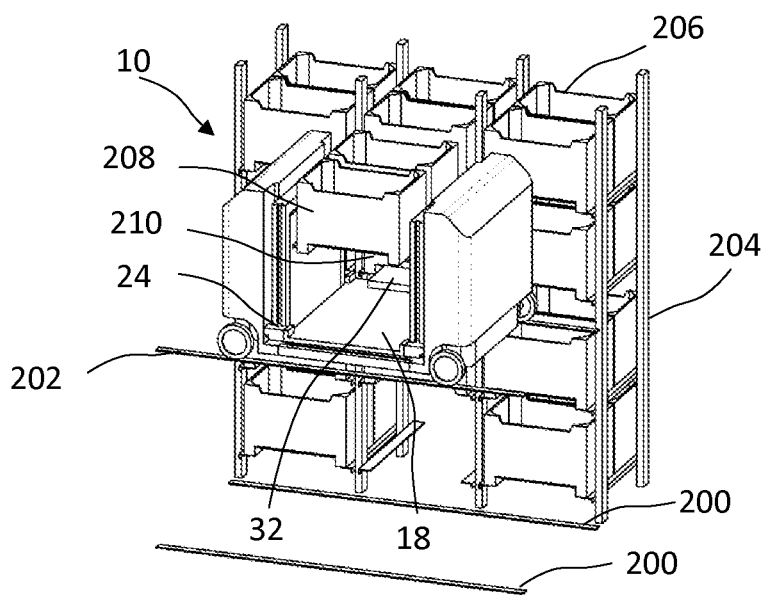
Figure 12:
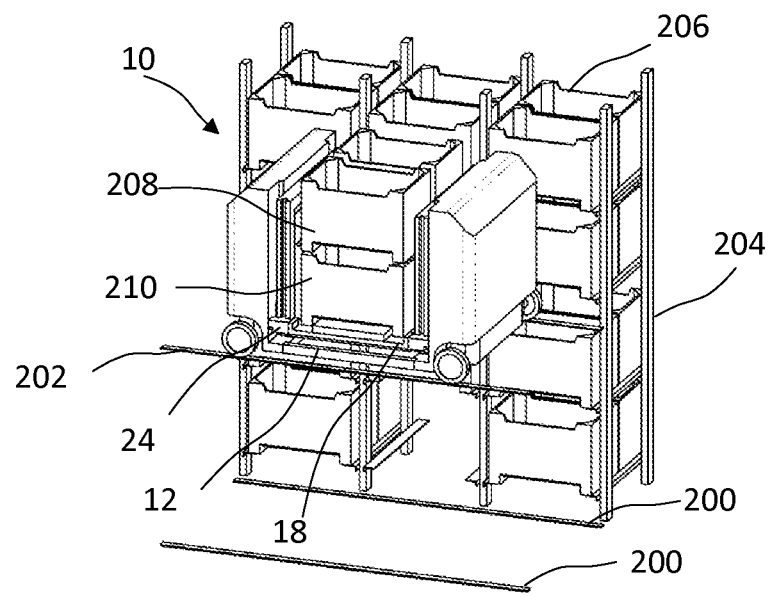

FIGS. 11 and 12 illustrate exemplary operations performed by the robotic device 10 to load additional boxes while the boxes 208 are held by the holding elements 30. For example, as shown in FIG. 11, to load an additional box 210, the carriages 24 with the fixed platform 18 may be raised to a level selected so as to enable the grasping element 32 to take the box 210. Thereafter, the grasping element drive 114 extends the grasping element 32 in the direction of the box 210 to place the grasping element 32 under the box 210. The platform 18 is raised to allow the grasping element 32 to take the box 210 from the rack 204. As shown in FIG. 12, the grasping element 32 is moved back to the platform 18 so as to place the box 210 onto the platform 18.

As a result, the robotic device 10 is able to move in horizontal and vertical directions with boxes 208 held by the holding elements 30, and additional boxes 210 carried by the platform 18. Each side wall 20 may contain multiple rows of holding elements 30 at various horizontal levels. The robotic device 10 is capable of carrying multiple rows of boxes held by the multiple rows of the holding elements 30 and by the platform 18.

FIGS. 13-17 illustrate a procedure carried out for moving in a vertical direction a fully loaded robotic device 10 carrying boxes 208 held by the holding elements and boxes 210 held by the platform 18. For example, a procedure performed to move a robotic device down is illustrated.

Figure 13:
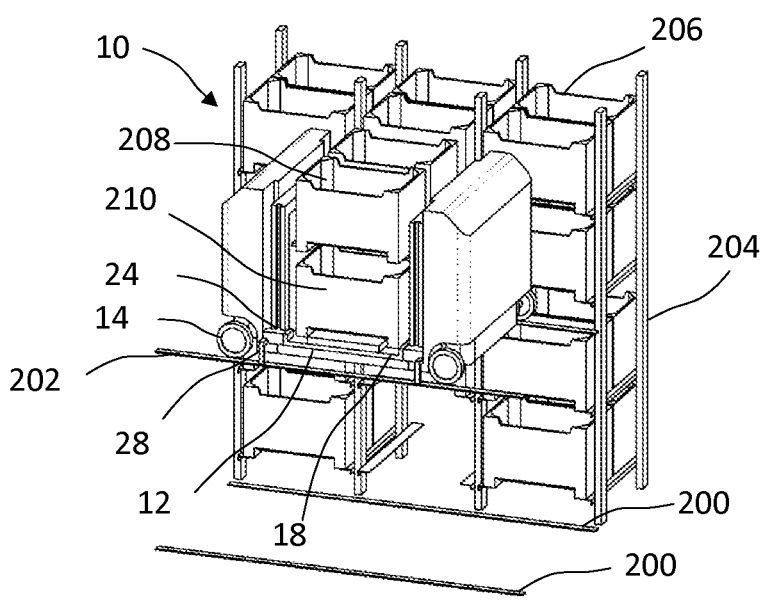
FIGS. 13-17 illustrate exemplary operations performed to enable the fully loaded robotic device to move in a vertical direction.

As shown in FIG. 13, before the robotic device 10 is moved in a vertical direction, the support handles 28 are controlled by the support handles drive 110 to extend the support handles 28 from the carriages 24. The size of the L-shaped pin in the support handle 28 is selected so as to disengage the wheels 14 from the rails 202 when the support handles 28 push against the rails 202. Then, the lifting mechanism drive 108 activates the lifting mechanisms 22 on the respective side walls 20 in order to move down the carriages 24 with the fixed platform 18 until the platform 18 contacts the frame 12. When the carriages 24 are being lifted down, the support handles 28 push against the rails 202, and the frame 12 becomes raised with respect to the rails 202.

Figure 14:
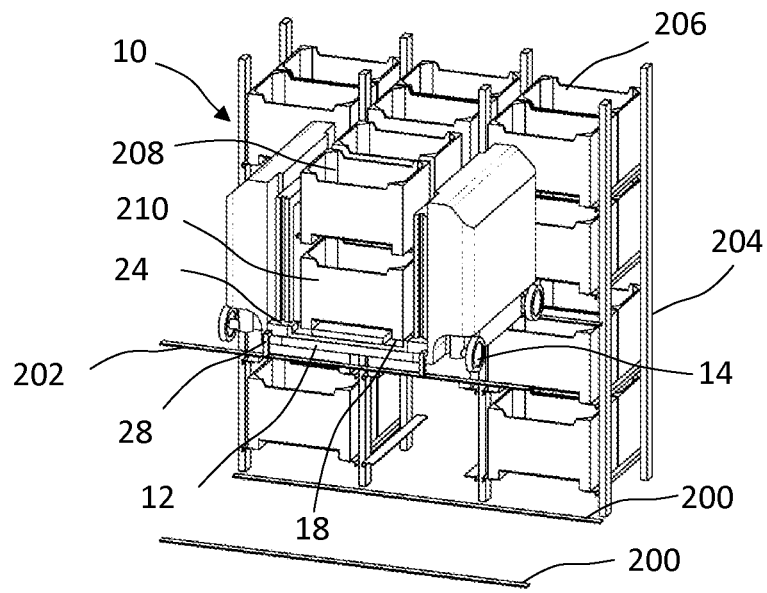

As shown in FIG. 14, when the wheels 14 become disengaged from the rails 202, the wheels 14 are turned by about 90 degrees in a horizontal plane using the respective turning elements 16. After the wheels 14 are turned or simultaneously with turning the wheels 14, the fixing elements drive 116 in each carriage 24 is activated to control the fixing elements 26 so as to unlock the carriages 24 from the platform 18.

Figure 15:
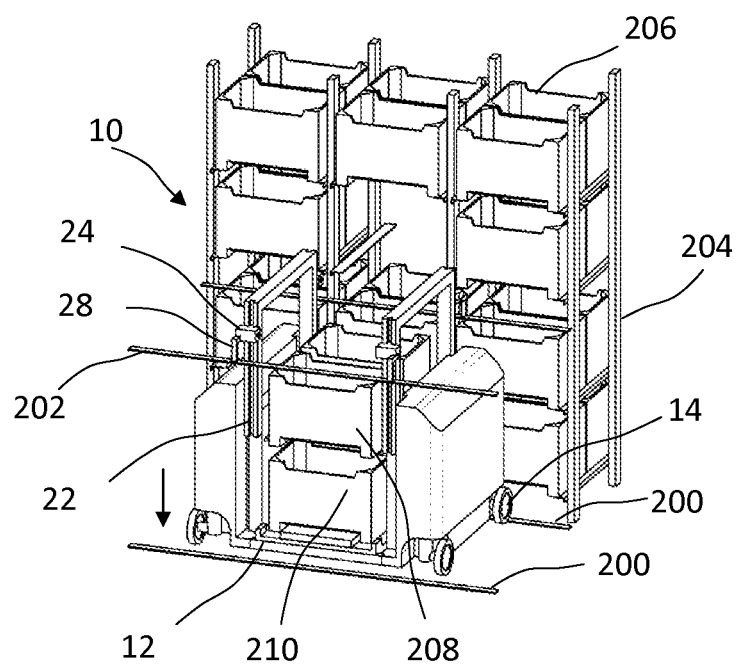

As shown in FIG. 15, the lifting mechanism 22 moves the frame 12 down. The platform 18 moves together with the frame 12. The boxes 208 and 210 held by the holding elements 30 and the platform 18 are also moved down together with the frame 12. However, the support handles 28 fix the carriages 24 to the rails 202.

The frame 12 is moved down to a level at which the wheels 14 are positioned directly above the rails 200. As the distance between the turned wheels 14 at each side of the robotic device 10 is smaller than the distance between the rails 202 in a horizontal direction perpendicular to the rails 202, the frame 12 with the wheels 14 is able to pass between the pair of rails 202.

Figure 16:
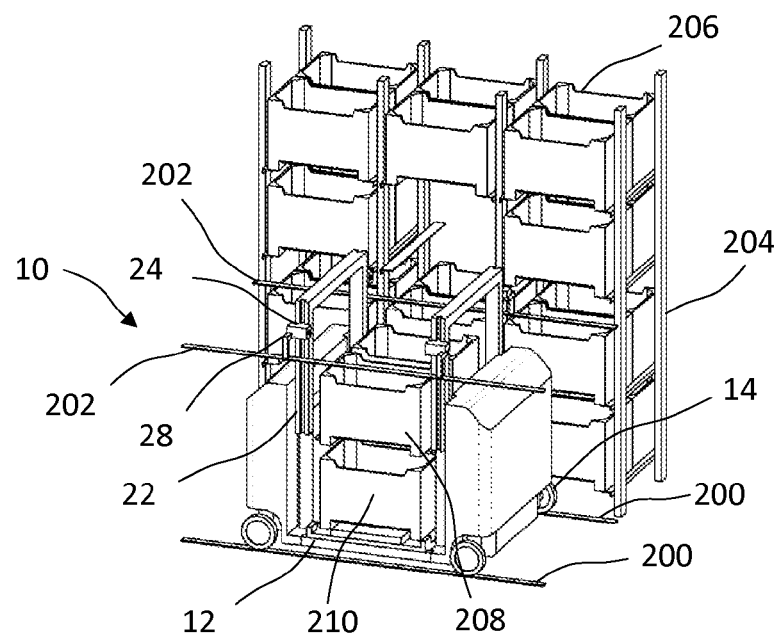

As shown in FIG. 16, when the frame 12 is lifted down to a desired position above the rails 200, the wheels 14 are returned to an initial position along the rails 200. Thereafter, the frame 12 is moved down to place the wheels 14 on the rails 200.

Figure 17:
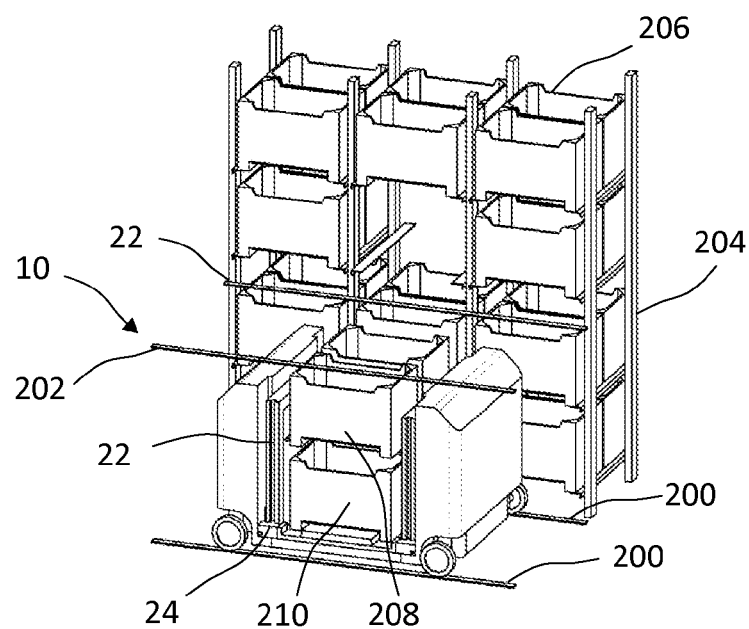

As shown in FIG. 17, when the wheels 14 are placed on the rails 200, the support handles 28 are removed from the rails 202 and placed into the slots on the carriages 24. Then, the lifting mechanism 22 is controlled to move the carriages 24 down to the platform 18. The fixing elements drives 116 controls the respective fixing elements 26 to fix the carriages 24 to the platform 18. As a result, the fully loaded robotic device 10 is ready to carry the boxes 208 and 210 in a horizontal direction along the rails 200.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A robotic device for carrying loads and movable in a vertical direction between rails arranged in multiple rows at various levels with respect to ground, the robotic device comprising:
   a frame,
   wheels coupled to the frame for moving the frame along the rails,
   a platform provided on the frame to carry a first load when the frame is moved in a vertical direction between first rails and second rails arranged above the first rails,
   movable carriages configured for being moved in the vertical direction at distance greater than a distance between the first rails and the second rails,
   a lifting mechanism for moving the carriages in the vertical direction with respect to the frame,
   and support handles arranged on the movable carriages and configured for providing engagement with the first or second rails to raise the frame above the respective rails to a level sufficient to disengage the wheels from the respective rails.

2. The robotic device of claim 1, wherein the supporting handles are further configured for raising the frame with respect to the first or second rails when the support handles push against the second rails.

3. The robotic device of claim 2, further comprising a wheels turning mechanism for turning the wheels with respect to a direction of the first or second rails when the frame is raised with respect to the first or second rails.

4. The robotic device of claim 3, wherein the platform is further configured for carrying a grasping element movable by the platform in a horizontal direction with respect to the frame to take a load and place the load onto the platform.

5. The robotic device of claim 4, wherein the movable carriages are fixed to the platform when the grasping element takes the load.

6. The robotic device of claim 5 further comprising:
   side walls attached to the frame, and
   holding elements provided on the side walls for holding the load.

7. A method of operating a robotic device movable in a vertical direction from first rails to second rails arranged at a different vertical level than the first rails, and having a frame, wheels coupled to the frame for moving the frame along the first and second rails, a platform for carrying a first load, holding elements for holding a second load above the first load, and a movable carriage having support handles, the method comprising the steps of:
   engaging the support handles with the second rails to move the frame in a vertical direction, and
   loading the first or second load when the movable carriage is fixed to the platform.

8. The method of claim 7, wherein the first and second loads are moved in the vertical direction together with the frame when the movable carriage is not fixed to the platform.

* * * * *